(12) United States Patent
Lambert (10) Patent No.: US 12,019,489 B1
(45) Date of Patent: Jun. 25, 2024

(54) SYSTEM AND METHOD FOR PROVISIONING FREE STANDING MODULES

(71) Applicant: Dell Products L.P., Round Rock, TX (US)

(72) Inventor: Timothy M. Lambert, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 50 days.

(21) Appl. No.: 18/159,897

(22) Filed: Jan. 26, 2023

(51) Int. Cl.
*G06F 1/26* (2006.01)
*G06F 9/455* (2018.01)

(52) U.S. Cl.
CPC .......... *G06F 1/266* (2013.01); *G06F 9/45508* (2013.01)

(58) Field of Classification Search
CPC .............................. G06F 1/266; G06F 9/4408
See application file for complete search history.

(56) References Cited

U.S. PATENT DOCUMENTS

| | | | |
|---|---|---|---|
| 7,308,705 B2 | 12/2007 | Gordy et al. | |
| 7,970,279 B2 | 6/2011 | Dress | |
| 9,331,899 B2 | 5/2016 | Christopher et al. | |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,733,116 B2 | 8/2020 | Litichever et al. | |
| 11,029,742 B2 | 6/2021 | Webel et al. | |
| 11,112,846 B2 | 9/2021 | Strach et al. | |
| 2006/0224742 A1* | 10/2006 | Shahbazi | H04L 63/20 709/226 |
| 2008/0126629 A1 | 5/2008 | Huang | |
| 2009/0300329 A1 | 12/2009 | Naffziger et al. | |
| 2014/0341109 A1* | 11/2014 | Cartmell | H04W 36/22 370/328 |
| 2017/0147052 A1 | 5/2017 | Waters et al. | |
| 2022/0130432 A1 | 4/2022 | Jayapal et al. | |

OTHER PUBLICATIONS

"DC-MHS R1 Overview," 2022 OCP Global Summit (56 Pages).
Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

(Continued)

*Primary Examiner* — Terrell S Johnson
(74) *Attorney, Agent, or Firm* — Womble Bond Dickinson (US) LLP (57) ABSTRACT

Methods and systems for managing operation of data processing systems are disclosed. To manage the operation of the data processing systems, the data processing systems may include a secure processing module that hosts a management controller. While free standing, the secure processing module may be selectively powered via a port. While selectively powered, the management controller may obtain data structures usable to resolve incompatibilities between modules of the data processing system. Once integrated with other modules, the data structures may be used to place the modules into compatibility with each other.

20 Claims, 4 Drawing Sheets

(56) References Cited

OTHER PUBLICATIONS

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

\* cited by examiner

SYSTEM AND METHOD FOR PROVISIONING FREE STANDING MODULES

FIELD

Embodiments disclosed herein relate generally to operation management. More particularly, embodiments disclosed herein relate to systems and methods to manage compatibility of modules of data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To provide flexibility in implementation, the data processing systems may be modularized. The modules of the data processing system may provide respective functionalities such as processing functionality, security functionality, management functionality, etc. Thus, specific functionalities may be achieved by incorporating a modules that includes the specific functionalities into a data processing system.

The modules may include any number of hardware components, which may in turn host various software components. The combination of hardware and software components may dictate how each modules will operate.

For the data processing system to operate nominally, the modules may need to cooperate with each other. In other words, the modules may need to cooperate (e.g., thereby being compatible with each other).

In scenarios in which some modules are not compatible, the operation of the modules may be updated through modifying of the software components of the modules. However, the incompatibilities of the modules may be so severe that the data processing system may be unable to successfully operate.

To resolve the incompatibilities to facilitate operation of the data processing system, a secure control module may include a management controller that may modify the software components of the module. The secure control module may include functionality to selectively power the management controller while the secure control module is free standing (e.g., not connected to other modules and through which power is normally obtained).

While free standing, the management controller may operably connect to a client (which may power the free standing secure control module) and obtain data structures (e.g., be provisioned with) usable to modify the software components of the modules. Consequently, once operably connected to the modules, the management controller may have access to the data structure likely necessary to place the modules into compatibility with one another.

By doing so, a data processing system in accordance with an embodiment may be more likely to be able to provide desired computer implemented services. For example, when initially constructed, various modules may not be compatible with one another. By proactively storing data structures likely to be needed to remediate the incompatibilities amongst the modules with a management controller, the resulting data processing system may be likely to be able to resolve incompatibilities without needing intervention from administrators or other systems. Thus, embodiments disclosed herein may address, among others, the technical problem of compatibility between modules of a modularized system. The disclosed embodiments may address this technical problem by improving the likelihood that corrective action may be taken even when incompatibilities between modules may otherwise prevent desired operation of the data processing system.

In an embodiment, a method for managing operation of data processing systems is provided. The method may include identifying an occurrence of a powering of a secure control module that is free standing; based on the occurrence: making a determination regarding whether the secure control module is powered by a client; in a first instance of the determination where the secure control module is powered by the client: overriding an automated discovery mechanism of the secure control module, the automated discovery mechanism adapted to discovery modules of a data processing system of the data processing systems; while the automated discovery mechanism is overridden: initiating emulation of a discoverable device via an interface to the client, the interface powering the secure control module during the occurrence; obtaining a data structure via the emulation of the discoverable device from the client; and performing an action set based on the data structure to update at least operation of the secure control module.

The method may also include, in a second instance of the determination where the secure control module is not powered by the client: initiating operation of the automated discovery mechanism.

Initiating the emulation of the discoverable device may include generating a file including human readable instructions, the human readable instructions indicating at least one software image to be provided to the discoverable device; storing the file in a storage; and presenting an emulated mass storage device to the client using the storage as the discoverable device.

Performing the action set may include flashing (e.g., modifying firmware/other software) a hardware component of the secure control module using the data structure to update operation of the hardware component.

Performing the action set may also include enabling the automated discovery mechanism.

Performing the action set may also include validating that the data structure is trusted. The validation may be performed through cryptographic methods. For example, signatures for the data structures may be used to validate that the data structure is from a trusted source.

Performing the action set may include queueing a flashing of a hardware component of a host processor module using the data structure to update operation of the hardware component.

The flashing may be queued to be performed once the host processor module is operably connected to the secure control module via a datacenter-ready secure control interface, the secure control module being powered via the datacenter-ready secure control interface while the flashing is performed.

The hardware component may include a field programmable gate array. The field programmable gate array may be flashed using the data structure.

In an embodiment, a non-transitory media is provided. The non-transitory media may include instructions that when executed by a processor cause the computer implemented method to be performed.

In an embodiment, a data processing system is provided. The data processing system may include the non-transitory media, a secure control module, a host processor module, and a processor, and may perform the computer implemented method when the computer instructions are executed by the processor.

In an embodiment, a secure control module is provided. The secure control module may include a management controller that may include the non-transitory media, a and a processor, and may perform the computer implemented method when the computer instructions are executed by the processor.

Figure 1:
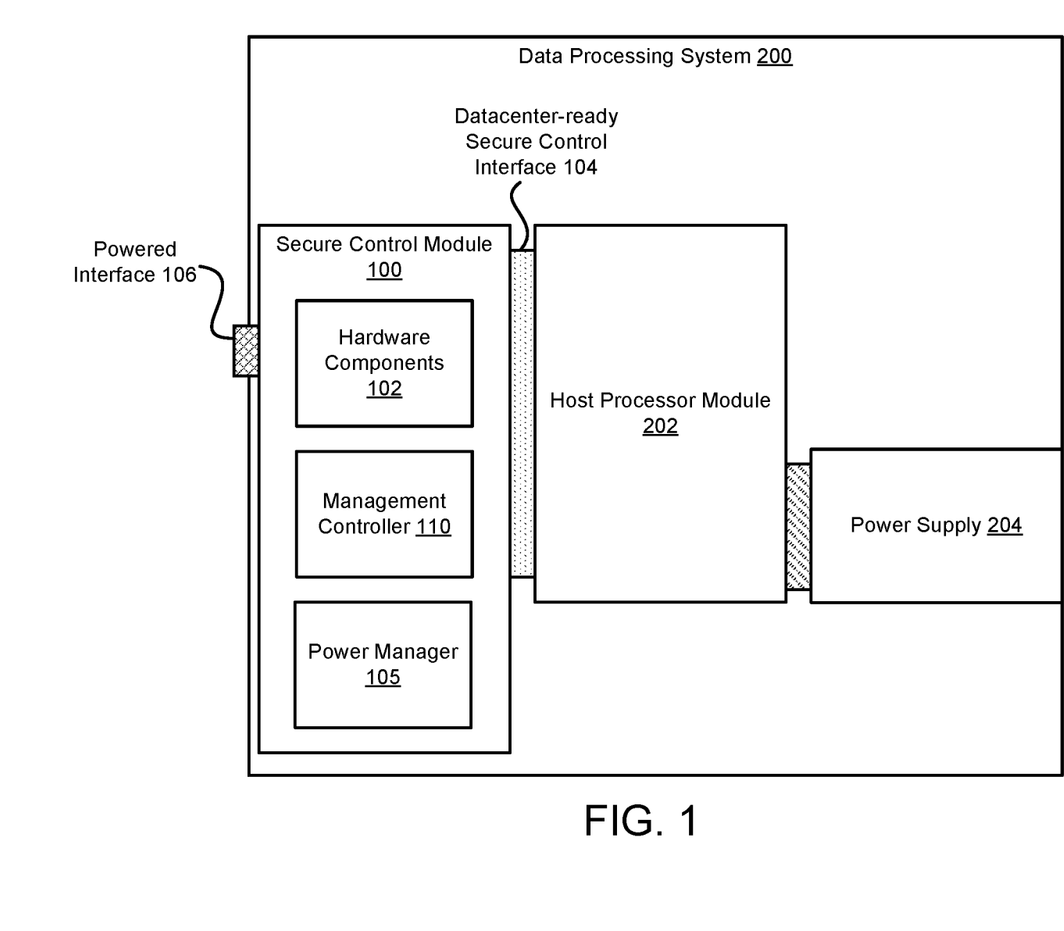
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 200. Data processing system 200 may provide the computer implemented services to users of data processing system 200 and/or to other devices (not shown).

To provide the computer implemented services, data processing system 200 may include various hardware components (e.g., processors, memory modules, storage devices, etc.) and host various software components (e.g., operating systems, application, startup managers such as basic input-output systems, etc.). These hardware and software components may provide the computer implemented services via their operation.

Data processing system 200 may be modularized. Hardware devices of data processing system 200 that provide different functionalities may be grouped into interchangeable modules. For example, data processing system 200 may include secure control module 100 and host processor module 202. Host processor module 202 may provide processing functionality (e.g., by including processors, memory modules, field programmable gate arrays and/or other types of special purpose hardware devices, etc.) while secure control module 100 may provide management and/or security functionality (e.g., when data processing system 200 is used as a block in a computing environment such as a data center, and may include hardware components 102 such as field programmable gate arrays and/or other types of special purpose hardware devices such as management controller 110). Data processing system 200 may include any number and type of modules that provide different or similar functionalities.

The modules may be operably connected to one another via any method. For example, a module may be implemented using a circuit card or other types of hardware component interconnection devices. The module may also include one or more connectors such as datacenter-ready secure control interface 104 that allow the module to interface (e.g., establish operable connections) with other modules. The providing interfaces may facilitate exchange of data between the module and power. For example, power supply 204 may provide power to host processor module 202, which may in turn provide some of the power to secure control module 100 while operably connected via datacenter-ready secure control interface 104.

However, the modules of data processing system 200 may need to be compatible with each other for data processing system 200 to operate nominally (e.g., as expected, desired, in accordance with standards, etc.). In other words, the hardware components may need to operate cooperatively, in accordance with a framework and/or standard, etc. If the hardware components do not operate in this manner, then data processing system 200 may not operate nominally.

For example, various types of errors in operation of data processing system 200 may occur when incompatibilities between modules exist. The errors may include communication errors, component operation errors, misinterpretation (e.g., of data structures) errors, and/or any other types of error in operation. The errors in operation may impair (partially or entirely) the functionalities of data processing system 200. Consequently, data processing system 200 may not provide computer implemented services desired by users when errors in operation occur.

To operate nominally, for example, various hardware components of the modules may need to operate in predetermined manners. To operate in the predetermined manners, the hardware components may need to host particular versions of software (e.g., firmware) that manage the operation of the modules. Different software (e.g., versions) may modify the manner in which the hardware components operate.

For example, over time different versions of software may be developed. However, the hardware components may not include functionality to automatically update their hosted version of the software to a most current version of the software, or a version that automatically places the operation of the hardware device into compatibility with the operation of other hardware devices. Accordingly, the hardware components of any of the modules may not necessarily operate in predetermined manners that ensure compatibility of any of the modules with other modules.

In general, embodiments disclosed herein may provide methods, systems, and/or devices for managing operation of data processing systems. To manage the operation of data processing systems, secure control module 100 may include management controller 110. Management controller 110 may manage the components of a data processing system (e.g., 200). When doing so, management controller 110 may update the operation of modules to provide for compatibility between modules and/or other reasons. For example, management controller 110 may include functionality to flash hardware components (e.g., updating operating software) of modules, modify configurations of modules, and/or initiate performance of other actions that may facilitate operation of data processing systems that include various modules.

However, to update the operation of hardware components, management controller 110 may need access to software images (e.g., firmware) or other types of data structures. Management controller 110 may include a limited amount of storage for storing software images (e.g., thereby making it prohibitive to store copies of all potential needed software images or other data structures usable for updating purposes), and may lack automated mechanisms through which it may obtain copies of new software images as software is updated by developers or other entities. Thus, any management controller 110 may lack access to software images or other data structures necessary to update the operation of hardware components of secure control module 100 and/or other modules operably connected to it via datacenter-ready secure control interface 104.

For example, when a data processing system is constructed using secure control module 100 and any number of modules, management controller 110 may not necessarily have copies of data structures necessary to place the other modules into compatibility with other modules of the newly constructed data processing system. As noted above, these incompatibilities may prevent the modules for operating correctly which, may in turn, prevent data processing systems hosting the modules from interacting with other systems to obtain necessary data structures for updating operation of the modules.

To reduce the likelihood of management controllers lacking access to data structures needed to update the operation of hardware components of modules, secure control module 100 may include selective and dual power functionality. The dual power functionality may allow secure control module 100 to obtain power via datacenter-ready secure control interface 104 or powered interface 106. Accordingly, secure control module 100 may be powered when operably connected to host processor module 202 (e.g., via datacenter-ready secure control interface 104) or powered interface 106 (e.g., via another device, refer to FIG. 2). Power interface 106 may be implemented using, for example, a universal serial bus port that includes functionality to both communicate with other devices and receive power from the other devices.

The selective power functionality may allow secure control module 100 to power some of its components depending on the source of power used in its operation. For example, the power may be selectively routed only to a subset of the components of secure control module 100 including management controller 110 (e.g., excluding hardware components 102) depending on the sources of the power. By doing so, management controller 110 may be active and able to communicate with other devices via powered interface 106 while other components of secure control module 100 are inoperable. As will be discussed below, this capability may be used to provide management controller 110 with access to data structures that will likely be used in the future to update the operation of various hardware devices (e.g., even to prior to being operably connected to any other modules) of modules.

To manage power received via powered interface 106 or power supply 204, secure control module 100 may include power manager 105. Power manager 105 may include functionality to selectively direct received power to different portions of secure control module 100. For example, power manager 105 may include circuitry (e.g., power divider networks, transistors, etc.) that may condition (e.g., manage voltage/current levels) and direct received power. Power manager 105 may direct the power based on the source of the power. For example, when power is received from secure control module 100, power manager may direct power to management controller 110 and my limit distribution of power to other components (e.g., thereby establishing a limited mode of operation). In contrast, when power is received from host processor module 202, power manager 105 may generally distribute power to hardware components 102 and management controller 110 (e.g., thereby establishing a regular mode of operation).

Figure 2:
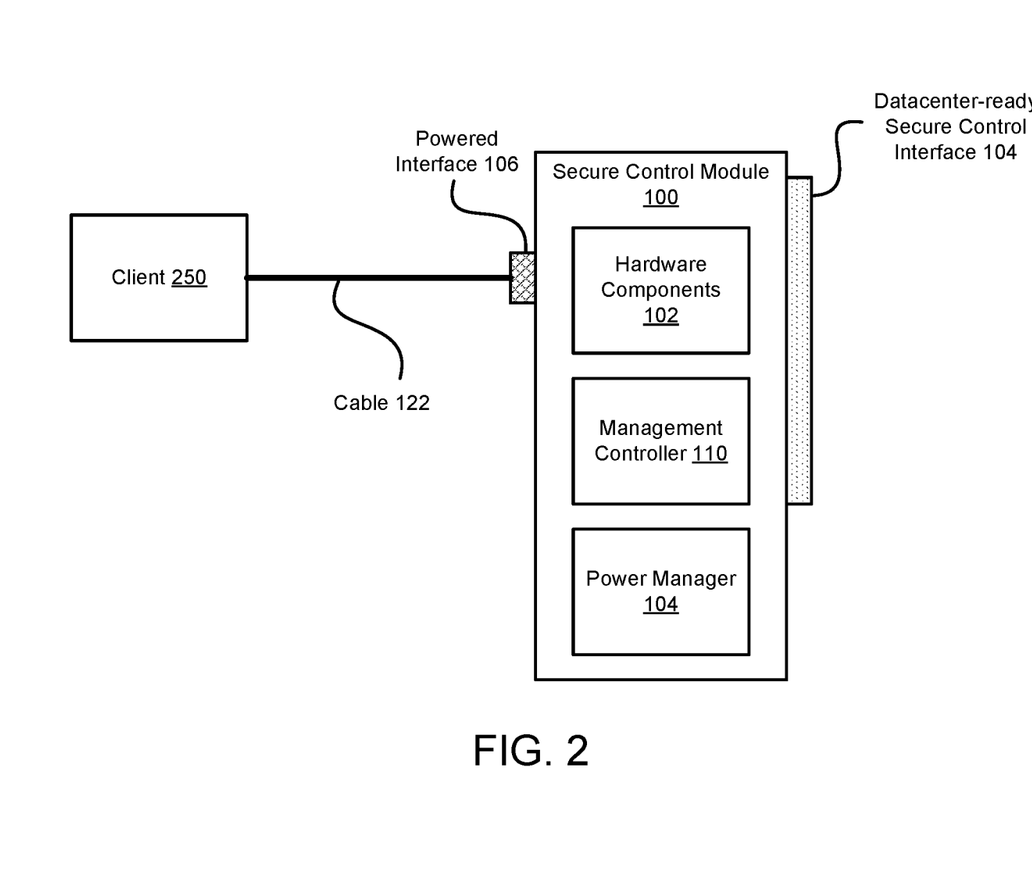
FIG. 2 show diagram illustrating a client and a secure control module in accordance with an embodiment.

When management controller 110 is powered, management controller may (i) ascertain a source of the power and (ii) perform different actions depending on the sources of the power. For example, while powered with power received via powered interface 106, management controller 110 may perform actions to acquire data via powered interface and/or otherwise prepare to update the operation of hardware components in the future. By doing so, prior to integration with other modules, a free standing secure control module 100 may be powered and provided with data structures usable to update the operation of hardware components to which it will likely be connected to in the near future. Refer to FIG. 2 for additional details regarding powering of a free standing secure control module.

Figure 3:
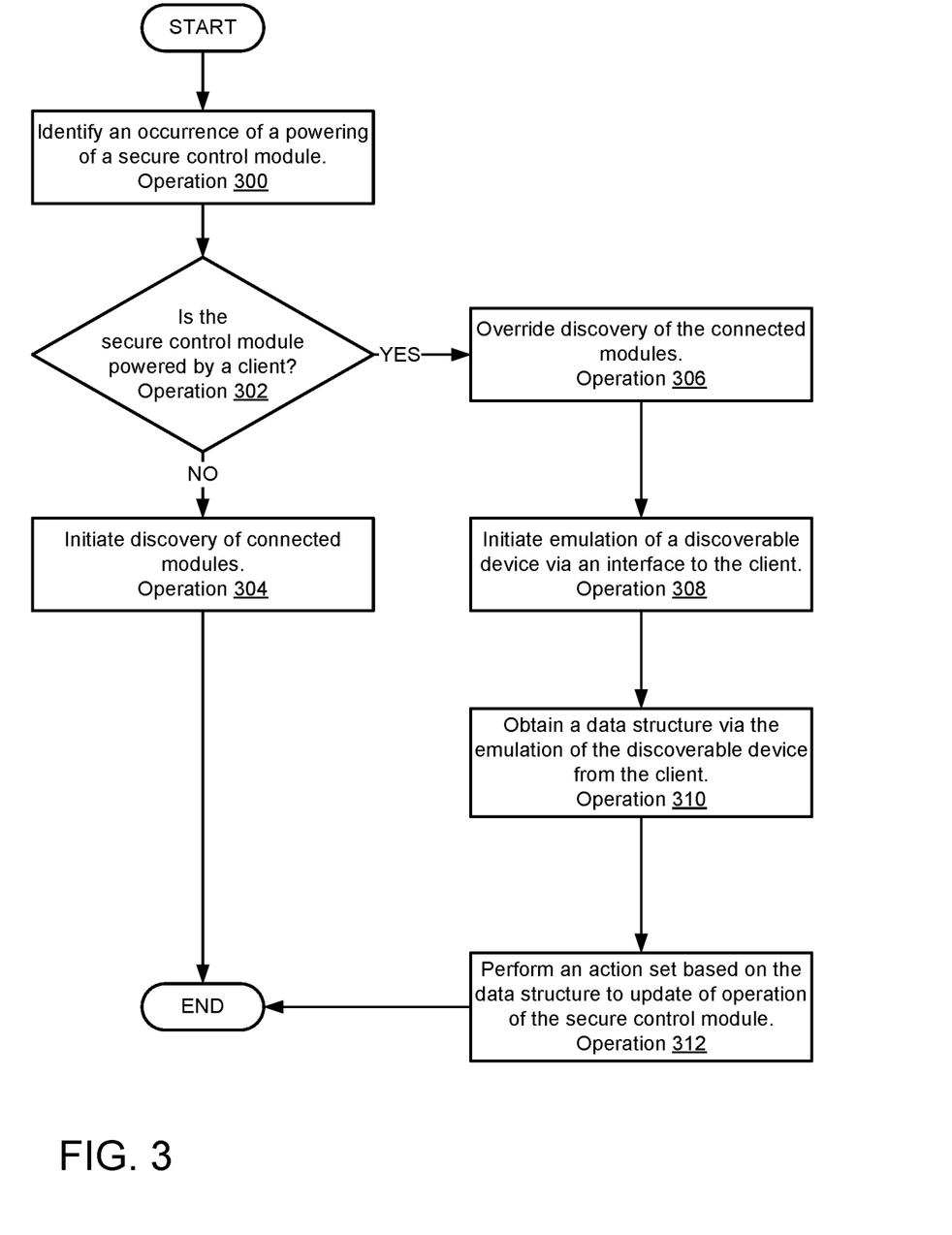
FIG. 3 shows a flow diagram illustrating a method of managing the operation of data processing systems in accordance with an embodiment.

When providing its functionality, data processing system 200, or components thereof, may perform all, or a portion, of the method illustrated in FIG. 3.

Data processing system 200 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those illustrated therein.

Now, consider a scenario where secure control module 100 will be integrated with other modules to obtain a data processing system. To successfully operate, the modules of the resulting data processing system may need to be compatible with one another.

Turning to FIG. 2, a diagram of secure control module 100 being prepared for integration with other modules in accordance with an embodiment is shown. To prepare secure control module 100 and while free standing or otherwise not operably connected to a host processor module, powered interface 106 may be operably connected to client 250 via cable 122. Cable 122 may include connectors compatible with a receptacle of power interface 106 and client 250. For example, cable 122 may be implemented with a universal serial bus type C cable that support transmission of data and power.

When connected to client 250, client 250 may transmit power to power manager 105 via cable 122 and powered interface 106. Doing so may cause power manager 105 to selectively power management controller 110 and/or a subset of other components of secure control module 100.

When so powered, management controller 110 may (i) abort or otherwise limit discovery procedures (e.g., that may attempt to discover devices connected via datacenter-ready secure control interface 104), (ii) present an emulated device to client 250 such as a mass storage or network device (e.g., by sending signals to client 250 indicating that a corresponding devices is actually present), and (iii) use the emulated device to provide information to client 250 and/or obtain data structures (e.g., responsive to the provided information) from client. In this manner, management controller 110 may obtain copies of data structures usable to update operation of hardware components (e.g., of secure control module 100 or other modules that may be operably connected to it).

Client 250 may be implemented using a computing device and a power hub (e.g., if the computing lacks power delivery capabilities). Client 250 may include or be able to retrieve that data structures usable to update hardware components from various locations. Client 250 may also store, for example, data structures usable to discriminate useful data structures (e.g., relevant to certain hardware components) from irrelevant data structure.

In an embodiment, management controller 110 is implemented using a processor adapted to execute computing code stored on a persistent storage that when executed by the processor performs the functionality of management controller 110 discussed throughout this application such as the processes discussed with respect to FIGS. 2-3. The processor may be a hardware processor including circuitry such as, for example, a central processing unit, a processing core, or a microcontroller. The processor may be other types of hardware devices for processing information without departing embodiment disclosed herein.

In an embodiment, management controller 110 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures discussed with respect to FIGS. 2-3. For example, the data structures may include lookup tables usable to identify software versions of and/or other characteristics of for modules that are necessary for compatibility with one another. These lookup may allow management controller 110 to identify data structures which may be used in the future for updating purposes. Any of these data structures may be implemented using, for example, lists, tables databases, linked lists, unstructured data, and/or other types of data structures.

As discussed above, the components of FIG. 1 may perform various methods to provide computer implemented services by completing startups (e.g., which may be required to be completed for the computer implemented services to be provided. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for manage operation of secure control modules when power is applied in accordance with an embodiment is shown. The method may be performed by data processing system 200, components thereof such as management controllers of secure control modules, or other components of the system shown in FIG. 1. For example, a management controller that operates independent from, manages the operation of, and/or is hosted by a data processing system may perform the method.

At operation 300, an occurrence of a powering of a secure control module is identified. The identification may be made by identifying that a management controller is receiving power from a power manager of the secure control module.

At operation 302, a determination is made regarding whether the secure control module is powered by a client. The determination may be made, for example, based on power states of other components of the secure control module, based on signals provided by the power manager, and/or via other methods.

If the secure control module is powered by the client, then the method may proceed to operation 306. Otherwise, the method may proceed to operation 304 (e.g., if powered by a module or other component of a host data processing system).

At operation 304, discovery of connected modules is initiated. The discovery may be performed by hardware components of the secure control module. The discovery may be performed by sending signals via a datacenter-ready secure control interface of the secure control module. The signals may comply with a standard for discovery of devices via the interface.

The method may end following operation 304.

Following and/or during operation 304, the operation of various hardware devices may be updated by, for example, using data structures stored in a management controller hosted by the secure processor module. For example, various update processes (e.g., flashing) may be performed.

Returning to operation 302, the method may proceed to operation 306 following operation 302 when the secure control module is powered by the client.

At operation 306, discovery of the connected modules may be overridden. The discovery may be automatically performed absent contrary action by a management controller. The discovery may be overridden by, for example, the management controller of the secure control module performing one or more actions or automatically via the selective powering of components of the secure control module.

At operation 308, emulation of a discoverable device is initiated via an interface to the client. The interface may be a powered interface, such as a universal serial bus interface through which power may be received.

In an embodiment, the discoverable device is a mass storage device. The mass storage device may be emulated by establishing a virtual device (e.g., using some amount of storage space of the management controller), signaling to the client via the interface that a mass storage device is present, and sending signals in accordance with a communication scheme which the discoverable device would comply with thereby allowing the client to interact with the emulated device. For example, the client may be able to store data structures in the emulated mass storage (e.g., thereby providing the management controller with access to the data structures).

In an embodiment, prior to signaling to the client, a file that includes human readable instructions may be generated and stored in the storage of the virtual device. The human readable instructions may indicate data structures to be stored in the emulated mass storage device. Consequently, a user of the client may access the file, identify the data structures, and store the identified copies of the identified data structures in the emulated mass storage.

In an embodiment, the discoverable device a network device (e.g., a universal serial bus network interface controller). The network device may be presented to the client in a similar manner as the mass storage device. However, the client may use the emulated network device to send/receive data structures to specific network locations. The management controller may store copies of the data structures directed to these network locations, thereby providing another mechanism through which the management controller may receive data from the client. Information may be provided to the client similarly (e.g., by sending data via the emulated network device to other network locations that the client may use for receipt of information from the management controller). For example, the data may be transferred via the hyper text transport protocol secure (HTTPS), the file transfer protocol (FTP), and/or other methods.

At operation 310, a data structure is obtained via the emulation of the discoverable device from the client. The data structure may be obtained by (i) providing information to the client device (e.g., regarding desired data structures) and/or (ii) receiving copies of data structures from the client device (e.g., some of which may be responsive to the provided information, some may be others provided for other reasons). Once the copies of the data structures are received, the emulation of the discoverable device may end (e.g., via detachment from the client side or management controller side).

At operation 312, an action set based on the data structure is performed to update operation of the secure module. The action set may include one or more of (i) validating obtained data structures (e.g., cryptographically using signature or other methods), (ii) flashing a hardware component of a secure control module using the validated data structures, and (iii) queuing flashing of a hardware component of another module (e.g., a host processor module or other type of module). The flashing may be queued for performance after another module operably connects to the secure control module (e.g., once the secure control module is integrated into a data processing system, thereby allowing it to be discovered as described with respect to operation 304) and through which the secure control module is subsequently powered.

The method may end following operation 312.

Using the method illustrated in FIG. 3, a secure control module in accordance with an embodiment may be prepared for integration with other modules while the secure control module is free standing. Consequently, when integrated, the management controller of the secure control module may be more likely to have access to data structures necessary to update the operation of control modules for compatibility with each other. Accordingly, a resulting data processing system may be more likely to be able to provide desired computer implemented services without additional modification for compatibility.

Figure 4:
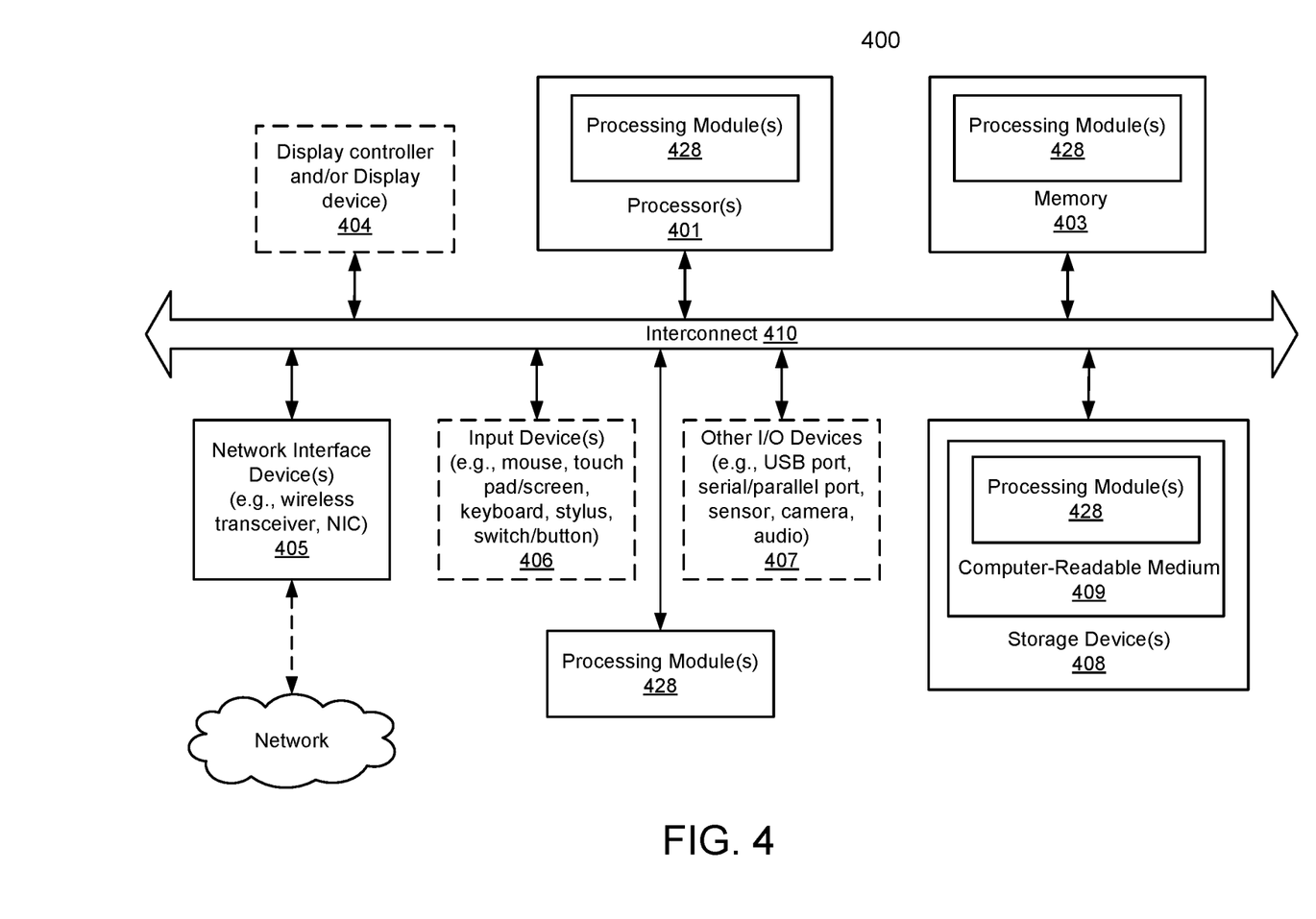
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of data processing systems, the method comprising:
   identifying an occurrence of a powering of a secure control module that is free standing;
   based on the occurrence:
      making a determination regarding whether the secure control module is powered by a client;
      in a first instance of the determination where the secure control module is powered by the client:
         overriding an automated discovery mechanism of the secure control module, the automated discovery mechanism adapted to discovery modules of a data processing system of the data processing systems;
         while the automated discovery mechanism is overridden:
            initiating emulation of a discoverable device via an interface to the client, the interface powering the secure control module during the occurrence;
            obtaining a data structure via the emulation of the discoverable device from the client; and
            performing an action set based on the data structure to update at least operation of the secure control module.

2. The method of claim 1, further comprising:
   in a second instance of the determination where the secure control module is not powered by the client:
      initiating operation of the automated discovery mechanism.

3. The method of claim 2, wherein initiating the emulation of the discoverable device comprise:
   generating a file comprising human readable instructions, the human readable instructions indicating at least one software image to be provided to the discoverable device;
   storing the file in a storage; and
   presenting an emulated mass storage device to the client using the storage as the discoverable device.

4. The method of claim 3, wherein performing the action set comprises:
   flashing a hardware component of the secure control module using the data structure to update operation of the hardware component.

5. The method of claim 4, wherein performing the action set further comprises:
   enabling the automated discovery mechanism.

6. The method of claim 4, wherein performing the action set further comprises:
   validating that the data structure is trusted.

7. The method of claim 3, wherein performing the action set comprises:
queueing a flashing of a hardware component of a host processor module using the data structure to update operation of the hardware component.

8. The method of claim 7, wherein the flashing is queued to be performed once the host processor module is operably connected to the secure control module via a datacenter-ready secure control interface, the secure control module being powered via the datacenter-ready secure control interface while the flashing is performed.

9. The method of claim 8, wherein the hardware component comprises a field programmable gate array.

10. A non-transitory machine-readable medium having instructions stored therein, which when executed by a processor, cause the processor to perform operations for managing operation of data processing systems, the operations comprising:
identifying an occurrence of a powering of a secure control module that is free standing;
based on the occurrence:
making a determination regarding whether the secure control module is powered by a client;
in a first instance of the determination where the secure control module is powered by the client:
overriding an automated discovery mechanism of the secure control module, the automated discovery mechanism adapted to discovery modules of a data processing system of the data processing systems;
while the automated discovery mechanism is overridden:
initiating emulation of a discoverable device via an interface to the client, the interface powering the secure control module during the occurrence;
obtaining a data structure via the emulation of the discoverable device from the client; and
performing an action set based on the data structure to update at least operation of the secure control module.

11. The non-transitory machine-readable medium of claim 10, wherein the operations further comprise:
in a second instance of the determination where the secure control module is not powered by the client:
initiating operation of the automated discovery mechanism.

12. The non-transitory machine-readable medium of claim 11, wherein initiating the emulation of the discoverable device comprise:
generating a file comprising human readable instructions, the human readable instructions indicating at least one software image to be provided to the discoverable device;
storing the file in a storage; and
presenting an emulated mass storage device to the client using the storage as the discoverable device.

13. The non-transitory machine-readable medium of claim 12, wherein performing the action set comprises:
flashing a hardware component of the secure control module using the data structure to update operation of the hardware component.

14. The non-transitory machine-readable medium of claim 13, wherein performing the action set further comprises:
enabling the automated discovery mechanism.

15. The non-transitory machine-readable medium of claim 13, wherein performing the action set further comprises:
validating that the data structure is trusted.

16. The non-transitory machine-readable medium of claim 12, wherein performing the action set comprises:
queueing a flashing of a hardware component of a host processor module using the data structure to update operation of the hardware component.

17. The non-transitory machine-readable medium of claim 16, wherein the flashing is queued to be performed once the host processor module is operably connected to the secure control module via a datacenter-ready secure control interface, the secure control module being powered via the datacenter-ready secure control interface while the flashing is performed.

18. The non-transitory machine-readable medium of claim 17, wherein the hardware component comprises a field programmable gate array.

19. A secure control module, comprising:
hardware component;
a management controller comprising:
a processor;
a memory coupled to the processor to store instructions, which when executed by the processor, cause the processor to perform operation, the operations comprising:
identifying an occurrence of a powering of the secure control module;
based on the occurrence:
making a determination regarding whether the secure control module is powered by a client;
in a first instance of the determination where the secure control module is powered by the client:
overriding an automated discovery mechanism of the secure control module, the automated discovery mechanism adapted to discovery modules of a data processing system of the data processing systems;
while the automated discovery mechanism is overridden:
initiating emulation of a discoverable device via an interface to the client, the interface powering the secure control module during the occurrence;
obtaining a data structure via the emulation of the discoverable device from the client; and
performing an action set based on the data structure to update at least operation of the secure control module.

20. The secure control module of claim 19, wherein the operations further comprise:
in a second instance of the determination where the secure control module is not powered by the client:
initiating operation of the automated discovery mechanism.

* * * * *